US012313816B2

(12) United States Patent
Radünz et al.

(10) Patent No.: US 12,313,816 B2
(45) Date of Patent: May 27, 2025

(54) OPTICAL ELEMENT WITH A STACK OF LAYER PACKETS, AND METHOD FOR PRODUCING THE OPTICAL ELEMENT

(71) Applicant: RODENSTOCK GMBH, Munich (DE)

(72) Inventors: Stefan Radünz, Gilching (DE); Rüdiger Scherschlicht, Unterhaching (DE)

(73) Assignee: RODENSTOCK GMBH, Munich (DE)

(*) Notice: Subject to any disclaimer, the term of this patent is extended or adjusted under 35 U.S.C. 154(b) by 651 days.

(21) Appl. No.: 17/274,481

(22) PCT Filed: Sep. 9, 2019

(86) PCT No.: PCT/EP2019/073979
§ 371 (c)(1),
(2) Date: Mar. 9, 2021

(87) PCT Pub. No.: WO2020/053140
PCT Pub. Date: Mar. 19, 2020

(65) Prior Publication Data
US 2022/0050227 A1 Feb. 17, 2022

(30) Foreign Application Priority Data
Sep. 13, 2018 (DE) .................. 10 2018 122 444.3

(51) Int. Cl.
G02B 1/115 (2015.01)
G02B 5/28 (2006.01)
(Continued)

(52) U.S. Cl.
CPC ............... G02B 1/115 (2013.01); G02B 5/28 (2013.01); G02C 7/02 (2013.01); G02C 7/10 (2013.01)

(58) Field of Classification Search
CPC ...... G02B 1/115; G02B 5/28; G02B 27/0012; G02C 7/10
(Continued)

(56) References Cited

U.S. PATENT DOCUMENTS

2013/0271836 A1   10/2013   Fukaya et al.
2016/0154254 A1*  6/2016    Bolshakov ............ G02B 1/115
                                             351/159.66
(Continued)

FOREIGN PATENT DOCUMENTS

DE    10 2015 100 091 A1    7/2016
EP         2 685 293 A2     1/2014
(Continued)

OTHER PUBLICATIONS

English translation of the Japanese Office Action on No. 2021-513194, dated Dec. 21, 2022.
(Continued)

Primary Examiner — Audrey Y Chang
(74) Attorney, Agent, or Firm — Birch, Stewart, Kolasch & Birch, LLP

(57) ABSTRACT

An optical element includes a substrate and an interferometric reflection-reducing layer system on at least one surface of the substrate. The layer system includes a stack of at least four successive layer packets, wherein each layer packet includes a first sub-layer with a first optical depth and a second sub-layer with a second optical depth which differs from the first optical depth. The refractive index of each first sub-layer nearer the substrate is greater than the refractive index of each second sub-layer further away from the substrate, of the respective stack, wherein the layer system has a brightness, a colorfulness, and a hue angle of a residual reflection color. The value of a change in the hue angle of the residual reflection color in a range of a viewing angle with
(Continued)

Figure 1:
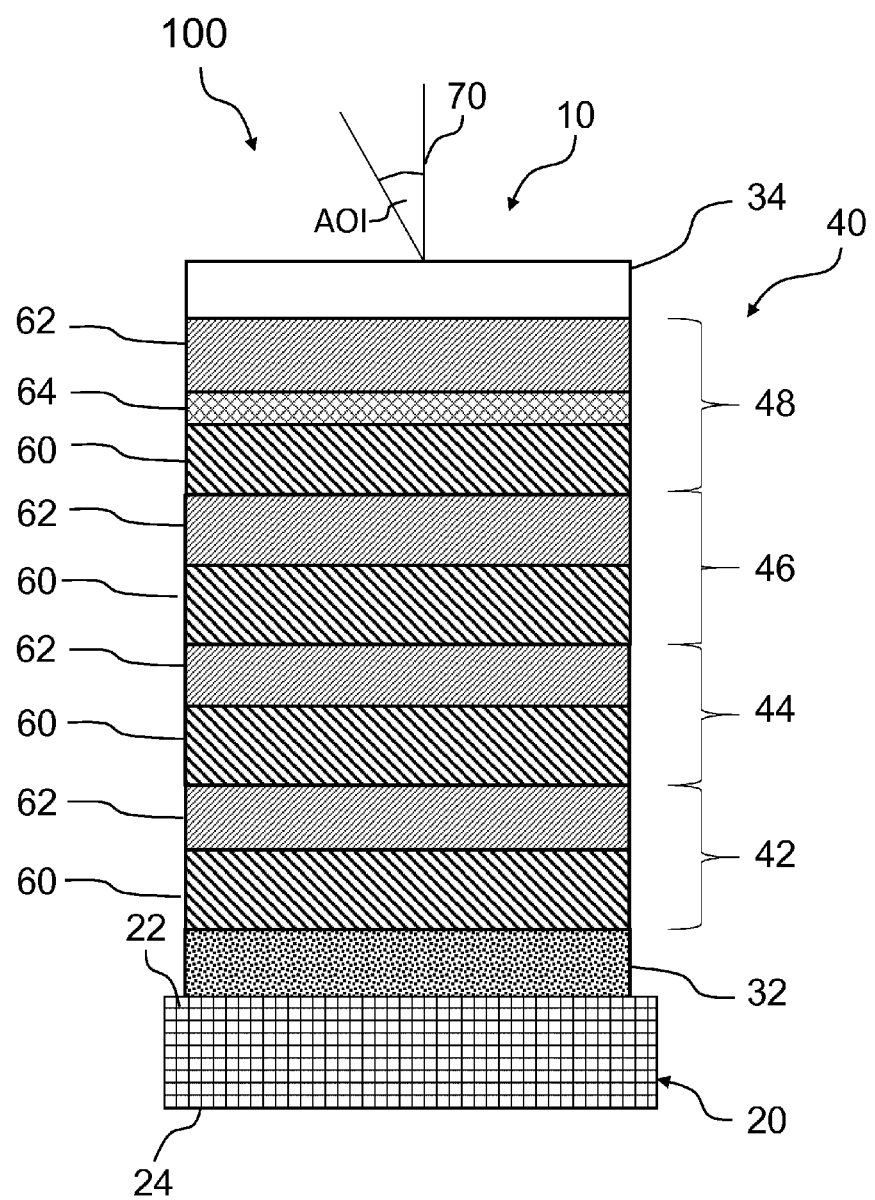

the boundary values of 0° and 30° relative to a surface normal to the layer system is smaller than the value of a change in the colorfulness in the range of the viewing angle.

17 Claims, 17 Drawing Sheets

(51) Int. Cl.
 *G02C 7/02* (2006.01)
 *G02C 7/10* (2006.01)
(58) Field of Classification Search
 USPC .......................................................... 359/586
 See application file for complete search history.

(56) References Cited

U.S. PATENT DOCUMENTS

2017/0075039 A1* 3/2017 Hart ...................... H05K 5/0017
2017/0351119 A1* 12/2017 Passard .................. G02C 7/104
2018/0067338 A1* 3/2018 Höfener ................. G02B 1/113

FOREIGN PATENT DOCUMENTS

| EP | 3 045 940 A1 | 7/2016 |
| WO | WO 2016/110339 A1 | 7/2016 |
| WO | WO 2018/158464 A1 | 9/2018 |

OTHER PUBLICATIONS

International Search Report, issued in PCT/EP2019/073979, dated Nov. 28, 2019.

* cited by examiner

OPTICAL ELEMENT WITH A STACK OF LAYER PACKETS, AND METHOD FOR PRODUCING THE OPTICAL ELEMENT

PRIOR ART

The invention relates to an optical element with a stack of layer packets, and a method for producing the optical element.

Known optical elements with interferometric anti-reflection, such as those known from WO 2016/110339 A1, usually have a light reflectance of about 1%, calculated according to the standard DIN EN ISO 13666:2013-10. The colour of the remaining residual reflection shows a strong variation when the viewing angle is changed. The variation extends over practically the entire visual colour scale.

DISCLOSURE OF THE INVENTION

It is the object of the invention to provide an optical element with an interferometric reflection-reducing layer system which exhibits only a small viewing angle-dependent variation in the colour of the residual reflection.

The objects are solved by the features of the independent claims. Favourable embodiments and advantages of the invention will be apparent from the further claims, the description, and the drawing.

Unless otherwise indicated, the terms used in this disclosure are to be understood in the sense of the standard DIN EN ISO 13666:2013-10 (EN ISO 13666:2012 (D/E)) and the DIN EN ISO 11664-4:2012-06 (EN ISO 11664-4:2011) of the Deutsches Institut fur Normung e.V.

According to section 4.2 of the DIN EN ISO 13666:2013-10, the term visible light, visible radiation, or a visible wavelength range, respectively, relates to optical radiation that is capable of directly causing a sensation of light in humans. Visible radiation generally refers to a wavelength range from 400 nm to 780 nm.

In the context of this disclosure, visible radiation can preferably refer to a wavelength range of 400 nm or 460 nm to 700 nm, respectively, corresponding to the sensitivity maximum of the human eye. This can simultaneously increase the design flexibility for the design of the filter characteristics and of the slew rate.

According to section 15.1 of the standard DIN EN ISO 13666:2013-10, the term spectral reflectance, reflectance or reflectivity, respectively, refers to the ratio of the spectral radiant power reflected by each material or surface or coating, respectively, to the incident radiant power for a specific wavelength ($\lambda$). In the present case, the reflectivity refers to the reflectivity of the entire coating with its multiple high and low refractive index sub-layers and not to the reflectivity of a single sub-layer.

The invention is based on an optical element, comprising a substrate and an interferometric reflection-reducing layer system on at least one surface of the substrate, wherein the layer system comprises a stack of at least four successive layer packets, wherein each layer packet comprises a first sub-layer with a first optical thickness and a second sub-layer with a second optical thickness which differs from the first optical thickness, wherein a refractive index of the respective first sub-layer nearer to the substrate is greater than a refractive index of the respective second sub-layer further away from the substrate of the stack, wherein the layer system has a lightness, a chroma, and a hue angle of a residual reflection colour.

It is proposed that the absolute value of a change in the hue angle of the residual reflection colour in an interval of a viewing angle with the boundary values 0° and 30°, relative to a surface normal onto the layer system, is smaller than the absolute value of a change in the chroma in the interval of the viewing angle.

The chroma can also be referred to as colour saturation. The hue angle can also be referred to as the colour angle.

Advantageously, by varying the layer thicknesses of the sub-layers, a colour-stable layer system can be provided whose residual reflective colour does not change or changes only slightly even with a larger change in the viewing angle. Advantageously, a colour-stable residual reflection colour can be achieved by a suitable combination of chroma and hue angle over a large viewing angle range.

The first, nearer to the substrate, sub-layers of the layer packets in the stack can be formed from the same first material.

The second, further away from the substrate, sub-layers can also be made of the same second material which differs from the first material of the first sub-layers. It can be provided for that a functional layer of a third material, which has comparable refractive properties to the second sub-layer, is arranged in the layer packet furthest away from the substrate between the first and second sub-layer. For calculation purposes, the functional layer can be associated with the second sub-layer, if necessary. Alternatively, the materials of the first sub-layers can vary in the stack. Likewise, it can alternatively be provided for that the materials from which the second sub-layers are formed vary in the stack.

Advantageously, the layer system can comprise four or five layer packets. Preferably, five layer packets are provided. More than five layer packets can also be provided.

According to a favourable embodiment of the optical element, the chroma at the upper boundary value of the viewing angle can have a value of at most 16. Alternatively or additionally, the maximum value of the chroma in the interval of the viewing angle can be at most 16. This enables the realisation of all reflective colours with high colour constancy for a residual reflection, not only at the edge of the hue angle.

According to a favourable embodiment of the optical element, the hue angle in the interval of the viewing angle with the boundary values 0° and 30° can change by at most 15°, preferably by at most 10°. The colour impression of the residual reflection of the optical system remains completely or almost unchanged for an observer over a large range of the viewing angle.

According to a favourable embodiment of the optical element, the absolute value of the change in the hue angle in a second interval of a viewing angle from 0° to a boundary viewing angle with upper boundary values of 30° to 45°, relative to the surface normal onto the layer system, can be smaller than the absolute value of a change in the chroma in the second interval of the viewing angle, and the absolute value of the chroma at the boundary viewing angle can be at least equal to 2.

In particular, the hue angle h in the second interval can change by at most 20°, preferably by at most 15°. Advantageously, a colour-stable residual reflection colour results even with a larger variation in the viewing angle.

According to a favourable embodiment of the optical element, the photopic reflectance in the interval of the viewing angle with the boundary values 0° and 30° can be at most 1.5%, preferably at most 1.2%.

According to a favourable embodiment of the optical element, the scotopic reflectance in the interval of the viewing angle with the boundary values 0° and 30° can be at most 1.5%, preferably at most 1.2%.

According to a favourable embodiment of the optical element, the first sub-layers can be formed from a high refractive index material.

Advantageously, the first sub-layers can have at least one or more of the compounds $Ta_2O_5$, $TiO_2$, $ZrO_2$, $Al_2O_3$, $Nd_2O_5$, $Pr_2O_3$, $PrTiO_3$, $La_2O_3$, $Nb_2O_5$, $Y_2O_3$, $HfO_2$, InSn oxide, $Si_3N_4$, MgO, $CeO_2$, ZnS and/or their modifications, in particular their other oxidation states.

If two or more compounds are contained in a first sub-layer, these can be applied in layers, for example, or can also be provided mixed in one layer, for example by simultaneous application.

These materials are known as high classical refractive index materials for deployment in optical elements, such as for coating spectacle lenses. However, the higher refractive index sub-layers can also contain $SiO_2$ or other lower refractive index materials as long as the refractive index of the entire sub-layer is greater than 1.6, preferably at least 1.7, more preferably at least 1.8, most preferably at least 1.9.

According to a favourable embodiment of the optical element, the second sub-layers can be formed from a low refractive index material.

The lower refractive index sub-layers can have at least one of the materials $MgF_2$, SiO, $SiO_2$, $SiO_2$ with additions of Al, silanes, siloxanes in pure form or with their fluorinated derivatives. However, the lower refractive index sub-layers can also contain a mixture of $SiO_2$ and $Al_2O_3$. Preferably, the lower refractive index sub-layers can contain at least 80% by weight of $SiO_2$, more preferably at least 90% by weight of $SiO_2$.

Preferably, the refractive index of the low refractive sub-layers is at most 1.55, preferably at most 1.48, particularly preferably at most 1.4. These indications of refractive indices refer to normal conditions at a temperature of 25° C. as well as a reference wavelength of the light intensity used of 550 nm.

Typical examples of layer materials with different refractive indices are silicon dioxide ($SiO_2$) with a refractive index of 1.46, aluminium oxide ($Al_2O_3$) with a refractive index of 1.7, zirconium dioxide ($ZrO_2$) with a refractive index of 2.05, praseodymium titanium oxide ($PrTiO_3$) with a refractive index of 2.1, titanium oxide ($TiO_2$) and zinc sulphide (ZnS) each with a refractive index of 2.3. These values represent average values that can vary by up to 10%, depending on coating method and layer thickness.

Common optical glasses have refractive indices between 1.5 and 2.0. Layer materials with refractive indices smaller than 1.5, such as $MgF_2$, $SiO_2$, $Al_2O_3$, are therefore referred to as low refractive index materials in combination with optical glasses, while layer materials with refractive indices larger than 2.0, such as $ZrO_2$, $PrTiO_3$, $TiO_2$, ZnS, are referred to as high refractive index materials in combination with optical glasses.

The difference in refractive indices between the high refractive index and low refractive index materials of the first and second sub-layers is preferably at least 0.2 to at least 0.5, depending on coating method and layer thickness.

The materials used for this type of coatings are the typical materials applied to a substrate in optics by means of, for example, PVD-methods (PVD=physical vapour deposition) or CVD-methods (CVD=chemical vapour deposition).

According to a favourable embodiment of the optical element, at least the first sub-layers can be formed from a same first material and the second sub-layers can be formed at least predominantly from a same second material.

Optionally, the second sub-layers can be formed from the same second material and have a functional layer between the first sub-layer and the second sub-layer only in the layer packet furthest away from the substrate. The functional layer can have a low refractive index and can be added to the second sub-layer for calculation purposes, if required.

According to another aspect of the invention, a method for designing an optical element according to the invention is proposed.

The optical element comprises a substrate and an interferometric reflection-reducing layer system on at least one surface of the substrate, wherein the layer system comprises a stack of at least four successive layer packets, wherein each layer packet comprising a first sub-layer with a first optical thickness and a second sub-layer with a second optical thickness which differs from the first optical thickness, wherein a refractive index of the respective first sub-layer nearer to the substrate is greater than a refractive index of the respective second sub-layer further away from the substrate of the stack, wherein the layer system has a lightness, a chroma, and a hue angle of a residual reflection colour. The absolute value of a change in the hue angle of the residual reflection colour in an interval of a viewing angle having the boundary values of 0° and 30°, relative to a surface normal onto the layer system, is smaller than the absolute value of a change in the chroma in the interval of the viewing angle.

In the method, the following steps are performed: defining a layer design, comprising at least a first material for high refractive index sub-layers and a second material for low refractive index sub-layers, number of desired layer packets with the sub-layers, starting values of the thickness of the sub-layers; defining target colour values comprising lightness, chroma, and hue angle at least at boundary values for an interval of a viewing angle with boundary values of 0° and 30°; and performing an optimisation method for varying the single layer thicknesses until an optimisation target is reached.

According to a favourable embodiment, a value of at most 16 can be selected for the chroma at the upper boundary value of the viewing angle. Alternatively or additionally, a maximum value in the interval of the viewing angle of at most 16 can be selected for the chroma. This allows the realisation of all reflective colours with high colour constancy for a residual reflection, not only at the edge of the hue angle.

According to a favourable embodiment, the target colour values at the boundary values of the interval can be chosen to be equal or similar.

In particular, maximum deviations for the hue angles of different residual reflection colours can be specified.

For the residual reflection colour blue, a favourable permissible change $\Delta h$ in the hue angle in the interval of the viewing angle from 0° to 30° can preferably be at most $\Delta h=4°$, particularly preferably at most $\Delta h=3.5°$. A favourable permissible change $\Delta h$ in the hue angle in the interval of the viewing angle from 0° to 33° can preferably be at most $\Delta h=5°$, particularly preferably at most $\Delta h=4.5°$.

For a residual reflection colour green, a favourable permissible change $\Delta h$ in the hue angle in the interval of the viewing angle from 0° to 30° can preferably be at most $\Delta h=3°$, particularly preferably at most $\Delta h=2°$. A favourable permissible change $\Delta h$ in the hue angle in the interval of the viewing angle from 0° to 45° can preferably be at most $\Delta h=5°$, particularly preferably at most $\Delta h=4.6°$.

For a residual reflection colour yellow, a favourable permissible change $\Delta h$ in the hue angle in the interval of the viewing angle from 0° to 30° can preferably be at most Δh=1.5°, particularly preferably at most Δh=0.9°. A favourable permissible change Δh in the hue angle in the interval of the viewing angle from 0° to 45° can preferably be at most Δh=5°, particularly preferably at most Δh=4.6°.

For a residual reflection colour red, a favourable permissible change Δh in the hue angle in the interval of the viewing angle from 0° to 30° can preferably be at most Δh=6°, particularly preferably at most Δh=5.3°. A favourable permissible change Δh in the hue angle in the interval of the viewing angle from 0° to 45° can preferably be at most Δh=20°, particularly preferably at most Δh=16.8°.

DRAWING

Further advantages result from the following drawings description. In the figures, example embodiments of the invention are depicted. The figures, the description, and the claims contain numerous features in combination. The person skilled in the art will expediently also consider the features individually and combine them to form useful further combinations.

THE FOLLOWING ARE SHOWN BY WAY OF EXAMPLE

Figure 2:
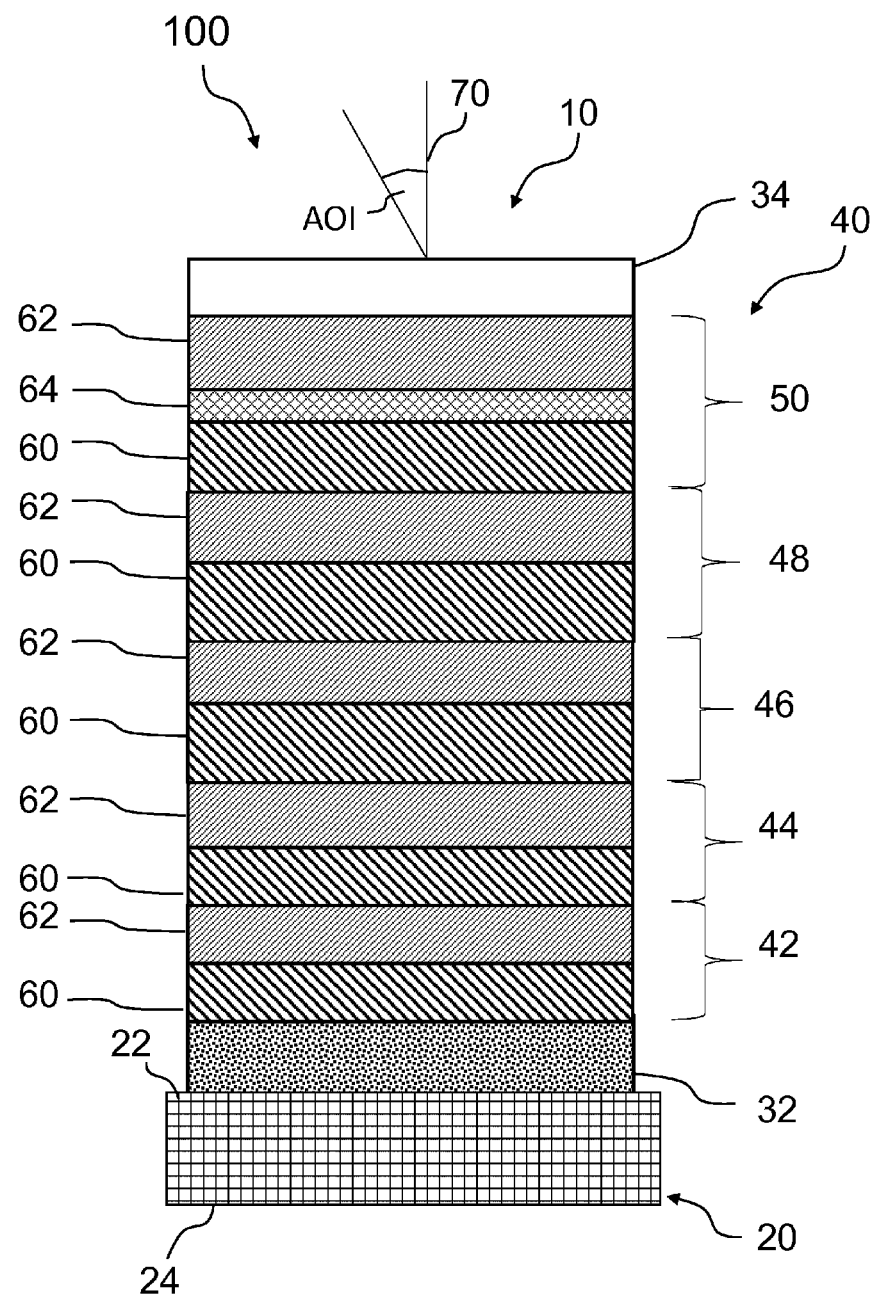
Figure 3:
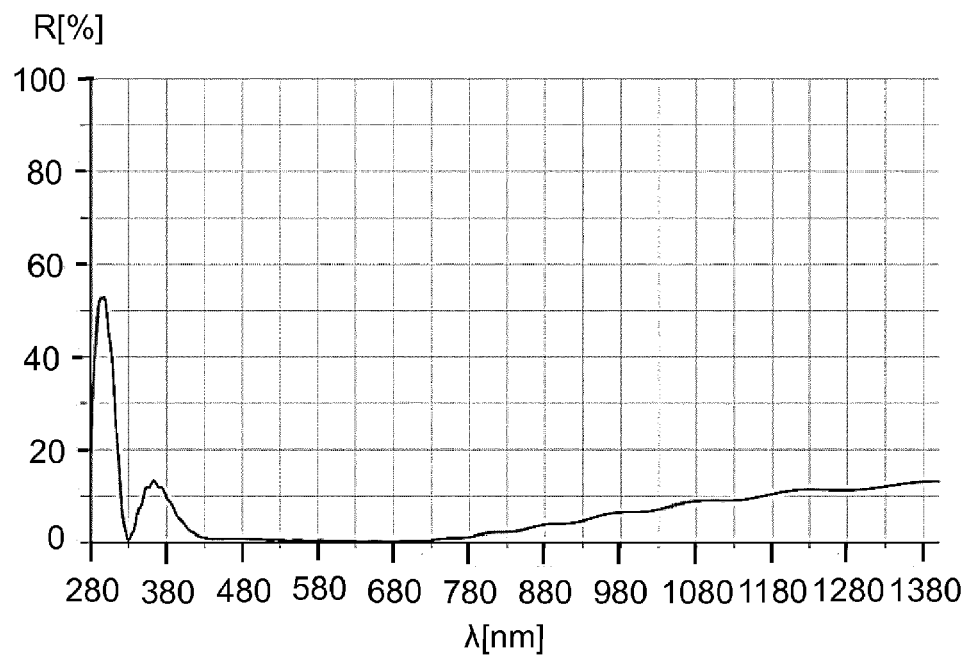
Figure 4:
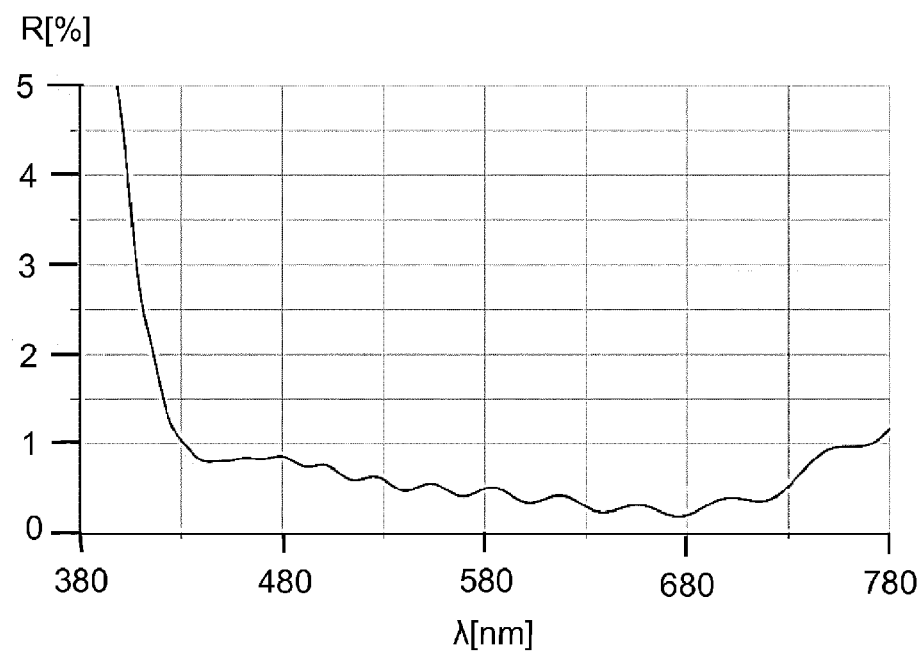
Figure 5:
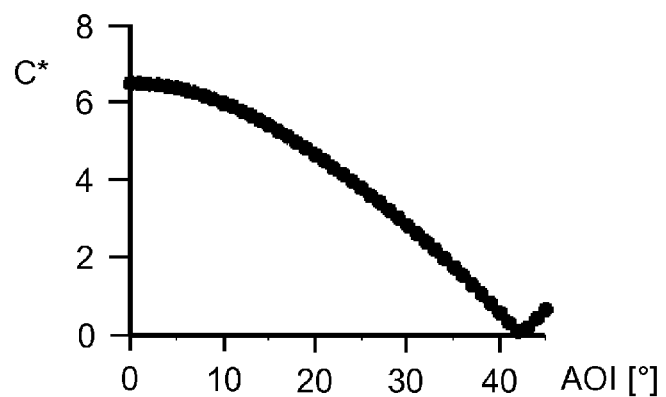
Figure 6:
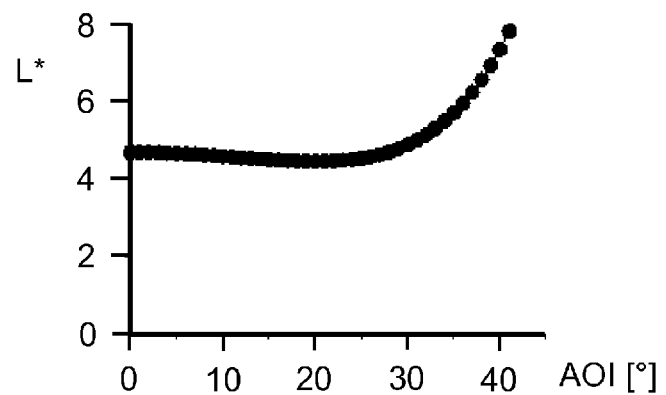
Figure 7:
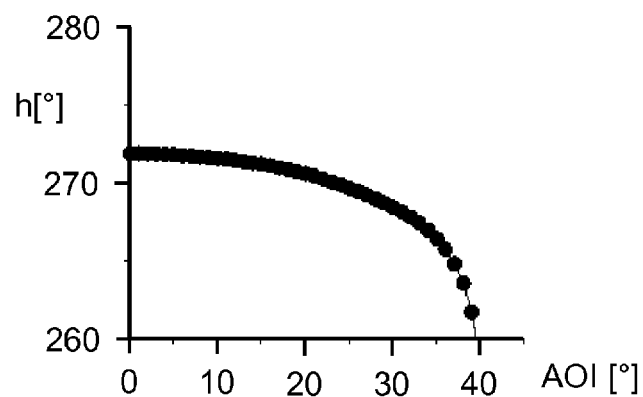
Figure 8:
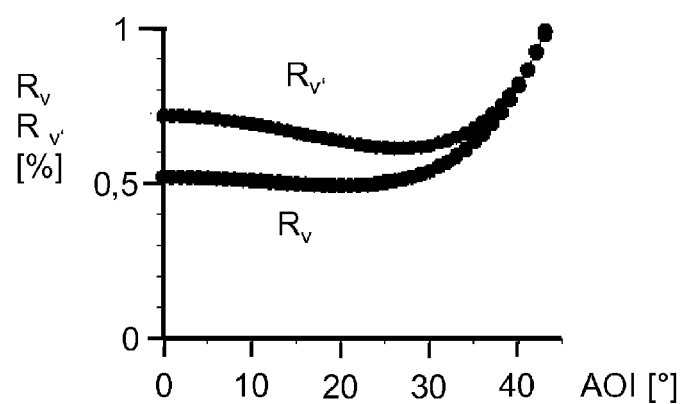
Figure 9:
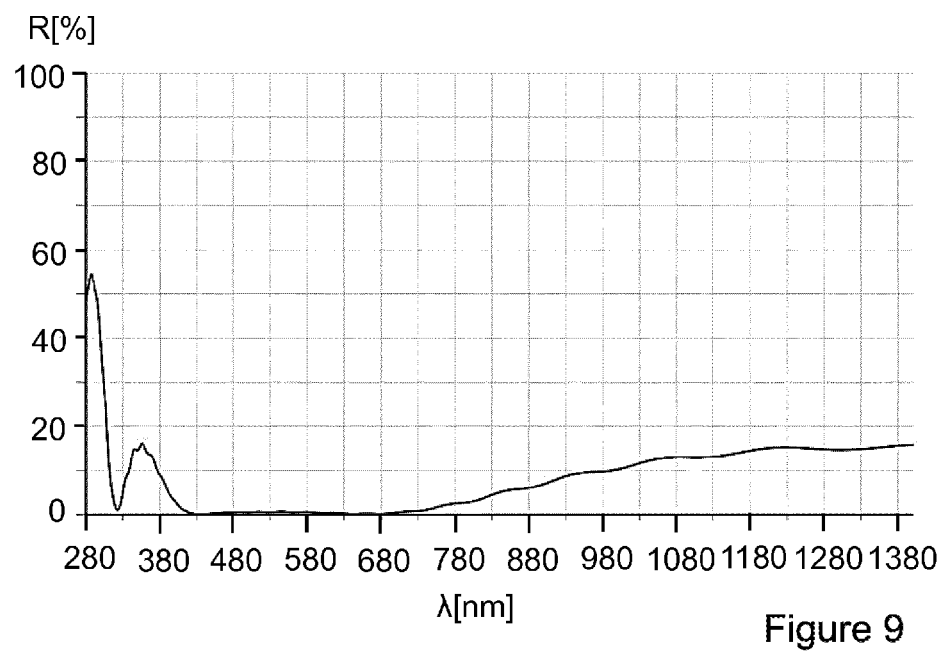
Figure 10:
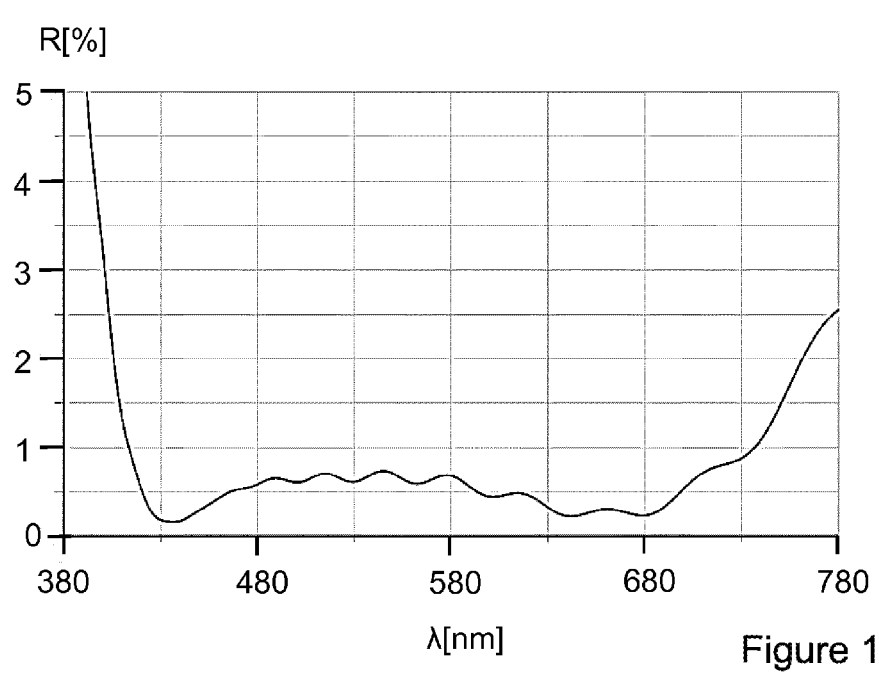
Figure 11:
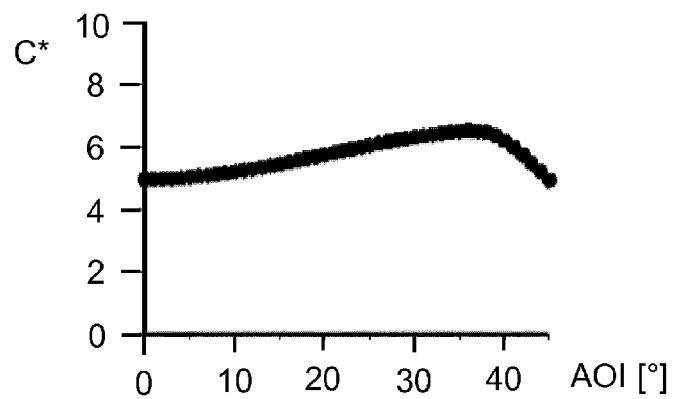
Figure 12:
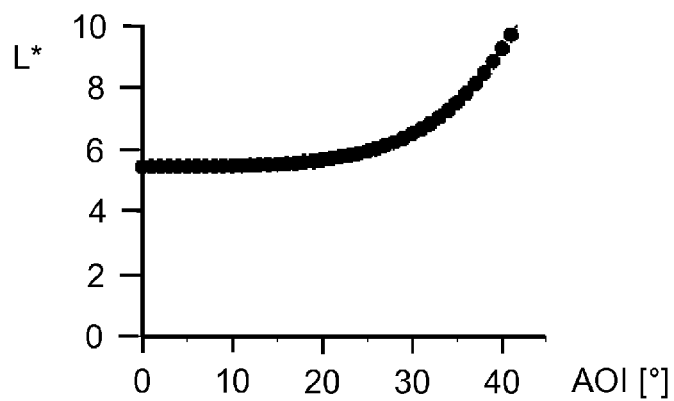
Figure 13:
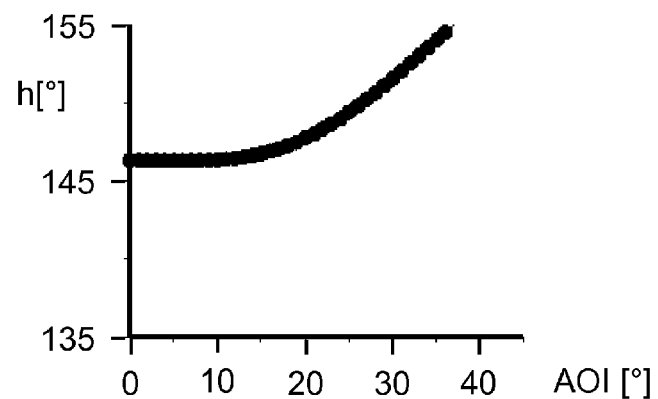
Figure 14:
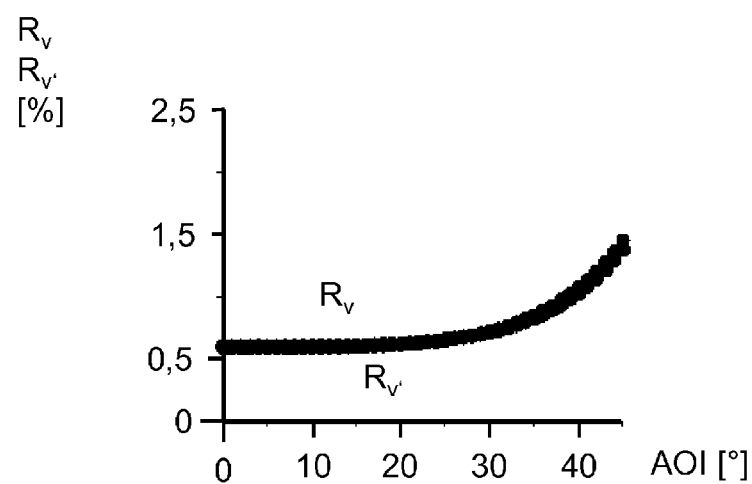
Figure 15:
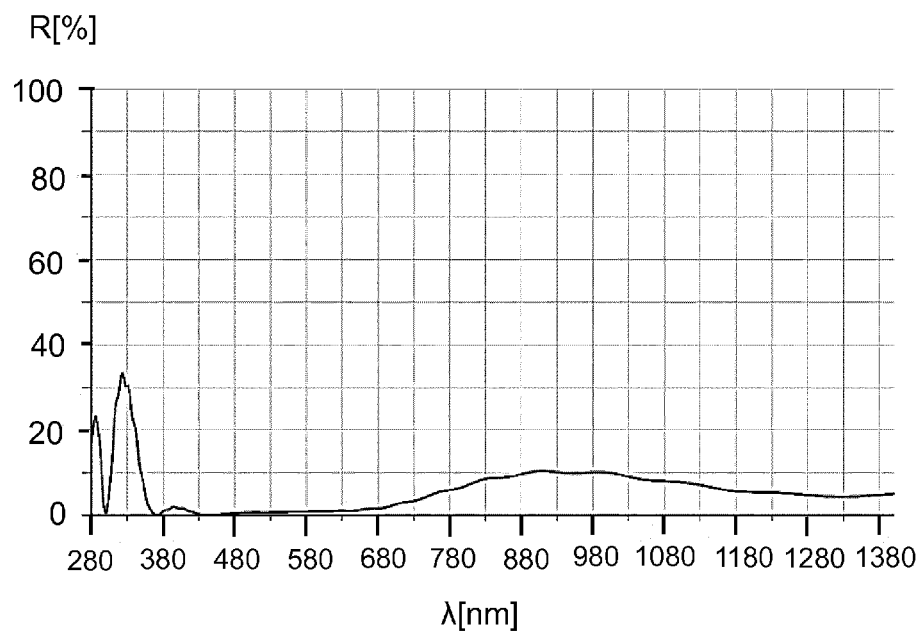
Figure 16:
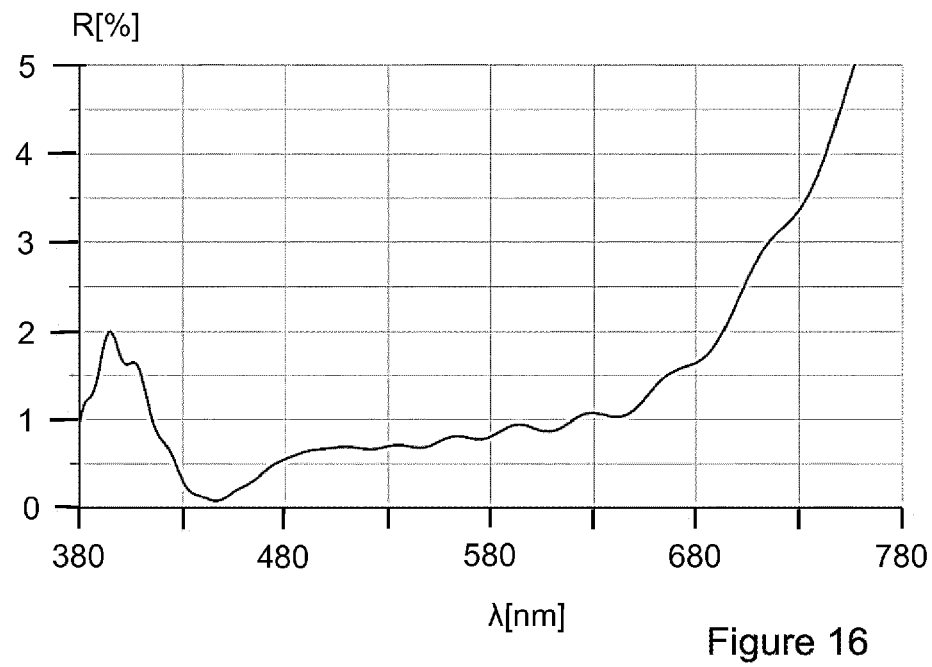
Figure 17:
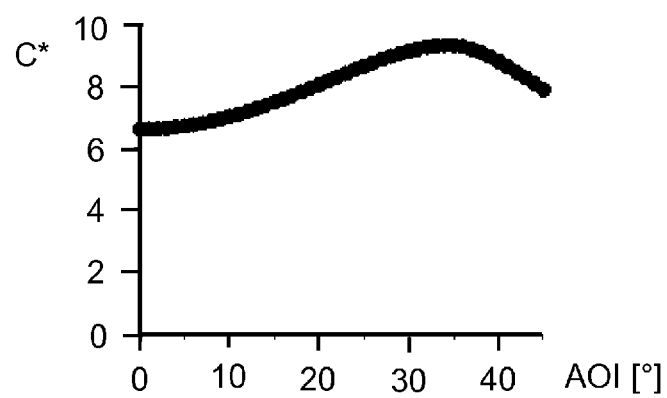
Figure 18:
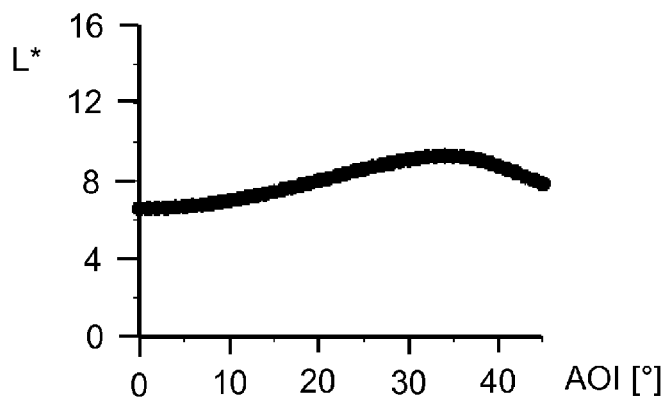
Figure 19:
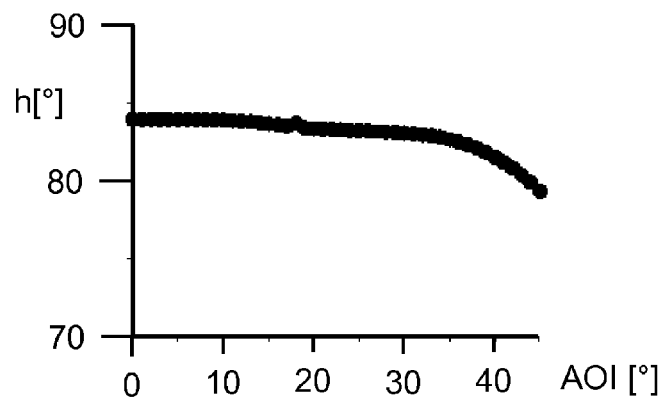
Figure 20:
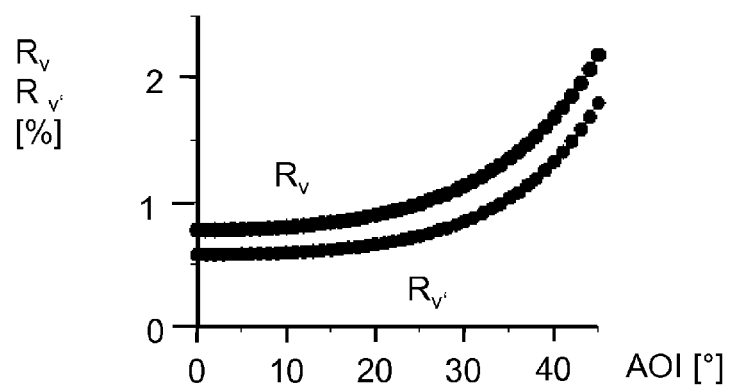
Figure 21:
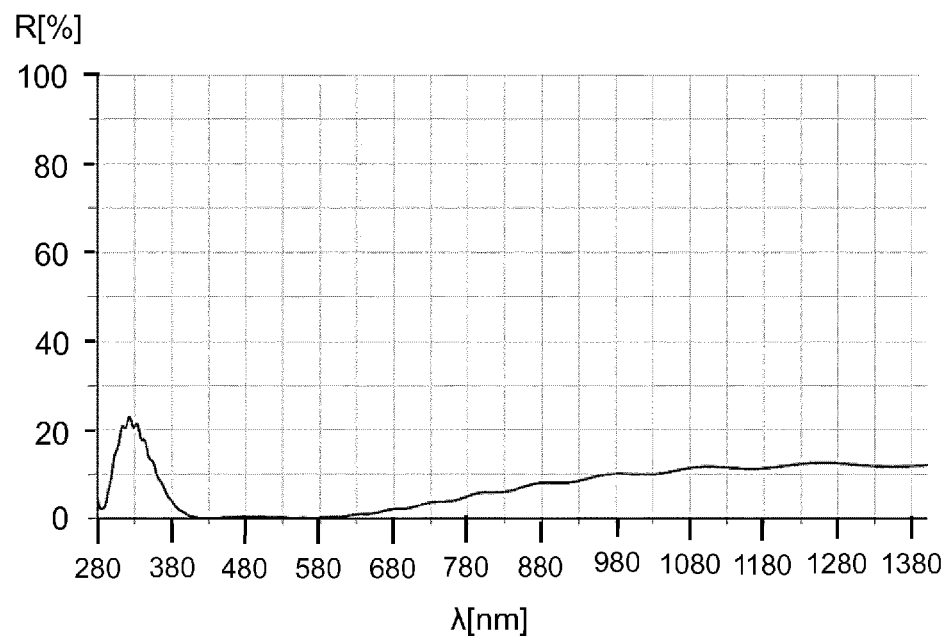
Figure 22:
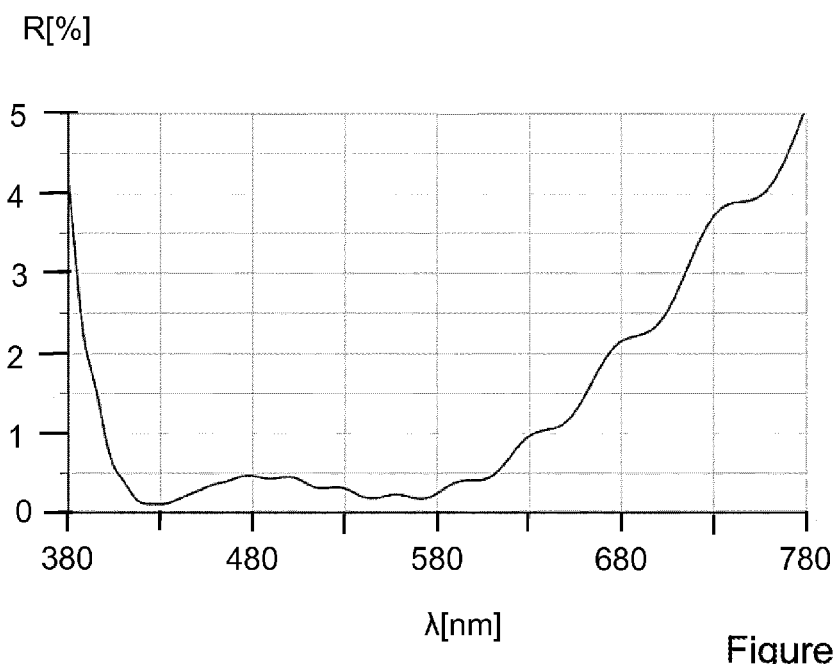
Figure 23:
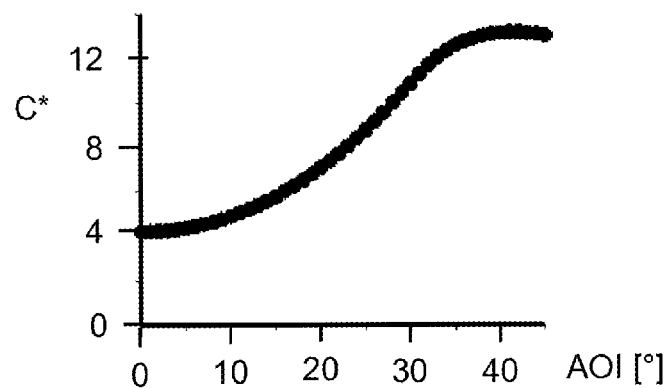
Figure 24:
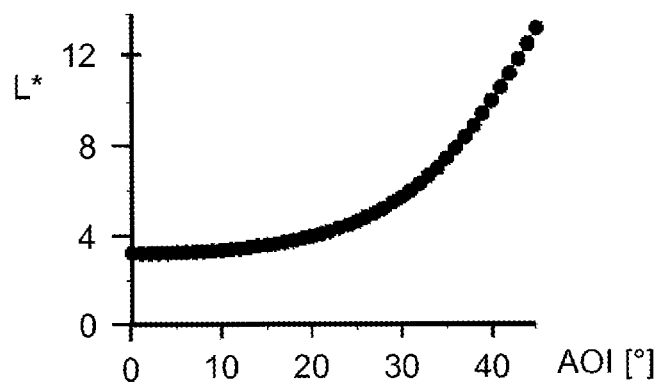
Figure 25:
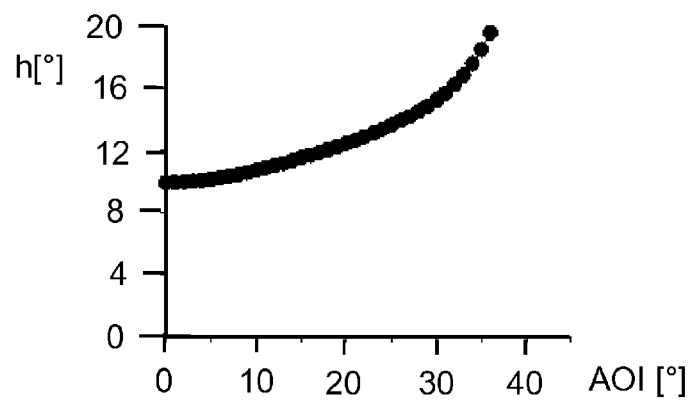
Figure 26:
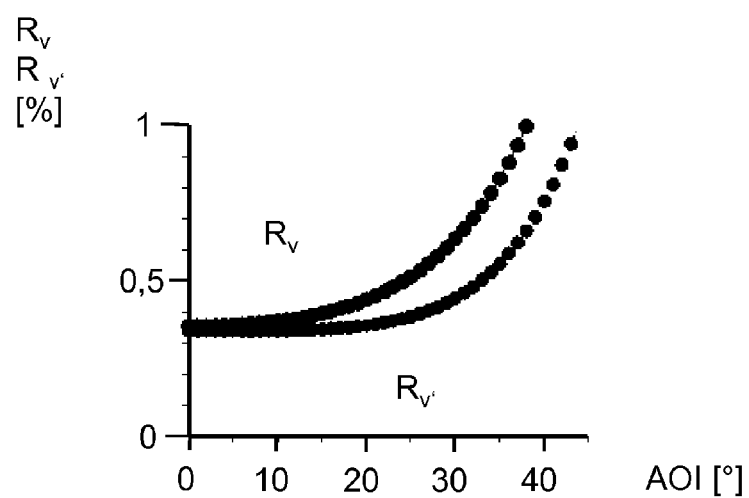
Figure 27:
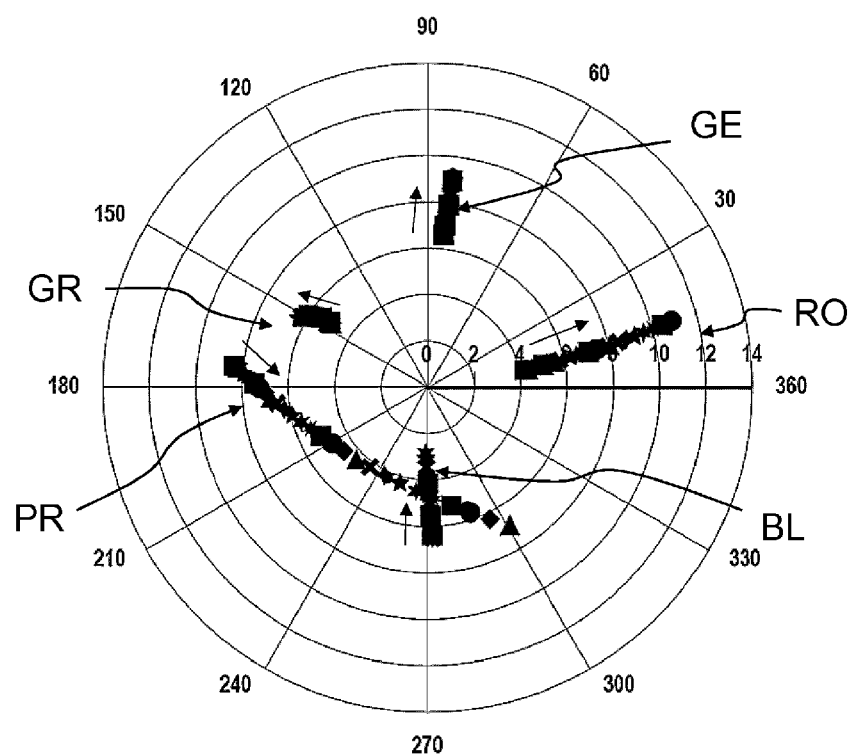
Figure 28:
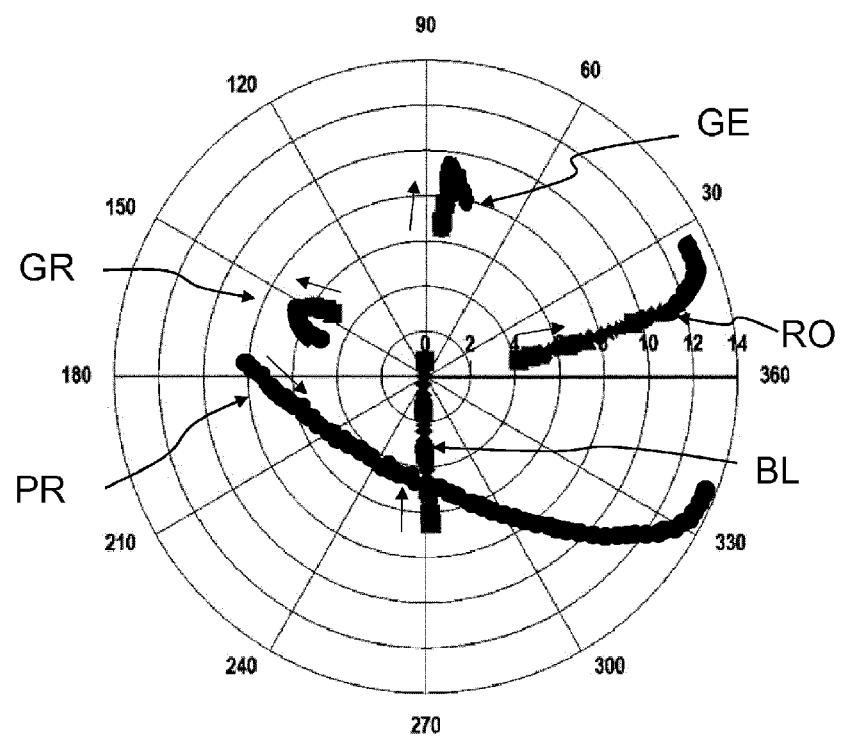
Figure 29:
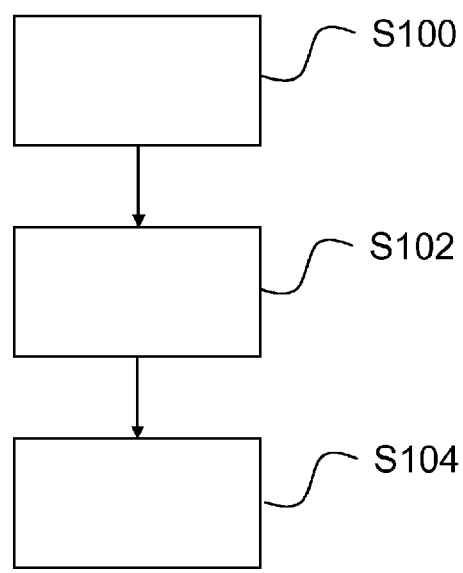

FIG. 1 an example embodiment of the invention in which a layer system has four layer packets on a substrate;

FIG. 2 an example embodiment of the invention in which a layer system has five layer packets on a substrate;

FIG. 3 a reflectivity of a layer system according to the invention with a residual reflection colour blue in the wavelength range between 280 nm and 1400 nm; FIG. 4 a detail of the representation in FIG. 3 in the wavelength range 380 nm to 780 nm;

FIG. 5 a progression of the chroma C* with the residual reflection colour blue, depending on the angle of incidence between 0° and 45°, according to FIG. 3;

FIG. 6 a progression of the lightness L* of the residual reflection colour blue, depending on the angle of incidence between 0° and 45°, according to FIG. 3;

FIG. 7 a progression of the hue angle h with the residual reflection colour blue, depending on the angle of incidence between 0° and 45°, according to FIG. 3;

FIG. 8 a progression of the photopic reflectance Rv and of the scotopic reflectance Rv' with the residual reflection colour blue, depending on the angle of incidence between 0° and 45°, according to FIG. 3;

FIG. 9 a reflectivity of a layer system according to the invention with a residual reflection colour green in the wavelength range between 280 nm and 1400 nm;

FIG. 10 a detail of the representation in FIG. 9 in the wavelength range 380 nm to 780 nm;

FIG. 11 a progression of the chroma C* with the residual reflection colour green, depending on the angle of incidence between 0° and 45°, according to FIG. 9;

FIG. 12 a progression of the lightness L* of the residual reflection colour green, depending on the angle of incidence between 0° and 45°, according to FIG. 9;

FIG. 13 a progression of the hue angle h with the residual reflection colour green, depending on the angle of incidence between 0° and 45°, according to FIG. 9;

FIG. 14 a progression of the photopic reflectance Rv and of the scotopic reflectance Rv' with the residual reflection colour green, depending on the angle of incidence between 0° and 45°, according to FIG. 9;

FIG. 15 a reflectivity of a layer system according to the invention with a residual reflection colour yellow in the wavelength range between 280 nm and 1400 nm; FIG. 16 a detail of the representation in FIG. 15 in the wavelength range 380 nm to 780 nm;

FIG. 17 a progression of the chroma C* with the residual reflection colour yellow, depending on the angle of incidence between 0° and 45°, according to FIG. 15;

FIG. 18 a progression of the lightness L* of the residual reflection colour yellow, depending on the angle of incidence between 0° and 45°, according to FIG. 15;

FIG. 19 a progression of the hue angle h with the residual reflection colour yellow, depending on the angle of incidence between 0° and 45°, according to FIG. 15;

FIG. 20 a progression of the photopic reflectance Rv and of the scotopic reflectance Rv' with the residual reflection colour yellow, depending on the angle of incidence between 0° and 45°, according to FIG. 15;

FIG. 21 a reflectivity of a layer system according to the invention with a residual reflection colour red in the wavelength range between 280 nm and 1400 nm, FIG. 22 a detail of the representation in FIG. 21 in the wavelength range 380 nm to 780 nm;

FIG. 23 a progression of the chroma C* with the residual reflection colour red, depending on the angle of incidence between 0° and 45°, according to FIG. 21;

FIG. 24 a progression of the lightness L* of the residual reflection colour red, depending on the angle of incidence between 0° and 45°, according to FIG. 21;

FIG. 25 a progression of the hue angle h with the residual reflection colour red, depending on the angle of incidence between 0° and 45°, according to FIG. 21;

FIG. 26 a progression of the photopic reflectance Rv and of the scotopic reflectance Rv' with the residual reflection colour red, depending on the angle of incidence between 0° and 45°, according to FIG. 21;

FIG. 27 a polar diagram with measurement values on layer systems according to the invention with different residual reflection colours and a layer system according to prior art in a first interval of a viewing angle of 0° to 30°;

FIG. 28 the polar diagram according to FIG. 27 in a further interval of the viewing angle from 0° to 45°;

FIG. 29 a convenient method for designing a layer system according to the invention.

EMBODIMENTS OF THE INVENTION

In the figures, components of the same kind or having the same effect are numbered with the same reference signs. The figures merely show examples and are not to be understood as limiting.

The directional terminology used in the following, with terms such as "left", "right", "top", "bottom", "before", "behind", "after" and the like, merely serves to provide a better understanding of the figures and is in no way intended to represent a limitation of generality. The represented components and elements, their design and use can vary in the sense of the considerations of a person skilled in the art and can be adapted to the respective applications.

The FIGS. 1 and 2 show an exemplary optical element 100, for example a spectacle lens, according to an example embodiment of the invention.

In FIG. 1, the optical element 100 comprises a layer system 10 with a stack 40 of four layer packets 42, 44, 46, 48 on a surface 22 of a substrate 20.

In FIG. 2, the optical element 100 comprises a layer system 10 with a stack 40 of five layer packets 42, 44, 46, 48, 50 on a surface 22 of a substrate 20.

Except for the different number of layer packets 42, 44, 46, 48, 50 (four in FIG. 1 and five in FIG. 2), the further explanations of general and specific nature relating to FIG. 1 also apply to the embodiment in FIG. 2, unless otherwise stated.

The layer system is viewed by an observer at a viewing angle AOI of 0° up to a boundary angle, for example 30°, measured from the surface normal 70.

The substrate 20 is, for example, a plastic, in particular a transparent plastic for a spectacle lens.

In particular, the term spectacle lens in the context of the present disclosure refers to a coated spectacle lens according to section 8.1.13 of the standard DIN EN ISO 13666:2013-10, thus a spectacle lens to which one or more surface coatings have been applied, in particular to modify one or more of its properties.

Preferably, such spectacle lenses can be advantageously deployed in particular as spectacles (with and without correction), sunglasses, ski goggles, workplace goggles, as well as spectacles in connection with head-worn display devices (so-called "head-mounted displays").

In the context of the present disclosure, the term spectacle lens can further comprise semi-finished spectacle lens products, in particular a spectacle lens blank or semi-finished spectacle lens product according to section 8.4.2 of the standard DIN EN ISO 13666:2013-10, i.e. a lens blank or blank with only one optically finished surface.

Referring to the embodiments in the FIGS. 1 and 2, the opposite surface 24 of the substrate 20 can optionally have another, similar or identical layer system 10, no coating, or only protective coating.

As lowest layer on the substrate 20, the layer system 10 usually has a single-layer or multilayer intermediate layer 32, for example for improving the adhesion of the stack 40 and/or as scratch protection for the substrate 20. This intermediate layer 32 can, for example, consist of substoichiometric low refractive index metal oxides, chromium, silanes, or siloxanes. The intermediate layer 32 is not relevant for the further considerations.

On the intermediate layer 32, in FIG. 1, the four layer packets 42, 44, 46, 48 of the stack 40 are arranged successively, each of the layer packets 42, 44, 46, 48 consisting of a sub-layer 60 nearer to the substrate followed by a sub-layer 62 further away from the substrate.

Preferably, each of the sub-layers 60 nearer to the substrate is formed from an identical first material. Preferably, the first material is a higher refractive index material with a first refractive index n1.

Preferably, each of the sub-layers 62 further away from the substrate is formed from an identical second material. Preferably, the second material is a low refractive index material with a second refractive index n2. The refractive index n1 is greater than the refractive index n2, preferably the difference of the refractive indices n1, n2 is at least 0.2, preferably up to at least 0.5.

The order of the sub-layers 60, 62 remains the same in the stack 40, so that in each layer packet 42, 44, 46, 48 the respective sub-layer 60 nearer to the substrate is always the higher refractive index one and the respective sub-layer 62 further away from the substrate is always the low refractive index one of the sub-layers 60, 62.

In particular, the higher refractive index sub-layers 60 can be layers of high refractive index materials and the lower refractive index sub-layers 62 can be layers of low refractive index materials.

The layer packets 42, 44, 46, 48 in the stack 40 differ only in their respective thickness and/or in the thicknesses of the single sub-layers 60, 62 in each layer packet 42, 44, 46, 48.

In a manner known per se, the stack 40 is terminated with a cover layer 34 which serves, for example, for maintaining the layer system 10. The cover layer 34 is applied to the last optically relevant sub-layer 62 of the uppermost layer packet 48 of the stack 40 and can contain fluorine-containing molecules. The cover layer 34 usually imparts an improved maintenance property to the stack 40, with properties such as a water repellent and oil repellent function at a surface energy of typically smaller than 15 mN/m.

The cover layer 34 is not relevant for further considerations.

The uppermost layer packet 48 (or layer packet 50 in FIG. 2, respectively), furthest away from the substrate, optionally has a functional layer 64 between the sub-layer 60 nearer to the substrate and the sub-layer 62 further away from the substrate, which can act, for example, for increasing electrical conductivity, for mechanical stress equalisation, or as diffusion barrier. This functional layer 64 can be formed from a low refractive index material and can be alloyed with other metal oxides such as for example aluminium. For calculation purposes and simulation purposes of the optical properties, the functional layer 64 can be added to the lower refractive index sub-layer 62 of the uppermost layer packet 48 (or layer packet 50 in FIG. 2, respectively), furthest away from the substrate, or, if necessary, it can be disregarded, for example, if the layer thickness is relatively low.

The optical properties of the stack 40 of the layer system 10 can be simulated by means of calculation methods and/or optimisation methods known as such. The layer system 10 is then produced with the determined layer thicknesses of the single sub-layers 60, 62 of the layer packets 42, 44, 46, 48.

In the production of optical layer systems 10, its optical properties of the layer system 10 are adjusted during the production of the sub-layers 60, 62. For example, the method known from WO 2016/1 10339 A1 can be used, which is briefly outlined below. With the known method, various optical effects such as mirroring or reflection reduction can be achieved in a material system by only changing the layer thicknesses but keeping the material used the same. However, other methods are also possible.

By varying the thicknesses of the layer packets as described in WO 2016/1 10339 A1 while keeping the materials the same, different reflectivities can be achieved, especially for a reflection-reducing effect. This is achieved by minimising or optimising, respectively, a parameter σ. The parameter σ is in turn a function of the layer thicknesses of the sub-layers 60, 62 or of ratios of the optical thicknesses t1, t2 of the sub-layers 60, 62, respectively, of each of the four layer packets 42, 44, 46, 48 according to FIG. 1 or five layer packets 42, 44, 46, 48, 50 according to FIG. 2, respectively, in the stack 40.

At a certain wavelength λ, the optical thickness t of a layer, also called FWOT (full wave optical thickness), is determined as $$t = \frac{d}{\lambda} \cdot n,$$

wherein d represents the layer thickness, λ represents the design wavelength, and n represents the refractive index of the sub-layer 60, 62.

A reflection-reducing effect by the stack 40 can be achieved for a predeterminable reflectivity $R_m$ of the stack 40 if the product of reflectivity $R_m$ and the parameter σ is set to smaller than 1:

$$R_m \cdot \sigma < 1$$

The reflectivity $R_m$, also called reflectance, here describes the ratio of reflected to incident intensity of a light beam as energy quantity. The reflectivity $R_m$ is expediently averaged over the range of the light from 380 nm to 800 nm and referred to 100%.

Such a condition $R_m * \sigma < 1$ can be applied as boundary condition for an optimisation process of the method for producing the layer system 10.

The optical thicknesses t1, t2 of the first and second sub-layers 60, 62 of the layer packets 42, 44, 46, 48 are determined by determining the parameter a by means of an optimisation method, preferably by means of a variational calculation.

Therein, preferably, the thicknesses of the respective sub-layers 60, 62, when four layer packets 42, 44, 46, 48 are in the stack 40, are formed as a function of a quotient $v_i$ (with i=1, 2, 3, 4) of the first optical thickness t1 of the respective higher refractive index first sub-layer 60 and the second optical thickness t2 of the lower refractive index second sub-layer 62 of the respective layer packet 42, 44, 46, 48.

The indices i=1, 2, 3, 4 stand for the order of the layer packets 42, 44, 46, 48 on the substrate 20. Accordingly, $v_1$ stands for the layer packet 42 nearest to the substrate and $v_4$ for the layer packet 48 furthest away from the substrate.

For a stack of four successive layer packets 42, 44, 46 48, the parameter σ can be determined from $$\sigma = \frac{v_1 + v_2}{v_3 + v_4}.$$

The first and second sub-layers 60, 62 are produced with the parameters calculated in this way, in particular the optical thicknesses t1, t2 of the sub-layers 60, 62 of the stack 40.

In an advantageous embodiment, in a layer system 10 according to FIG. 2, the parameter σ for a stack 40 with five successive layer packets 42, 44, 46, 48, 50 can be determined from the relationship $$\sigma = \frac{v_1}{\sum_{i=2}^{nmax} v_i},$$

wherein i=runs from 2 to nmax=5.

The indices i=1, 2, 3, 4, 5 stand for the order of the layer packets 42, 44, 46, 48, 50 on the substrate 20. Accordingly, $v_1$ stands for the layer packet 42 nearest to the substrate and $v_5$ stands for the layer packet 50 furthest away from the substrate.

It is known to specify perceptually related colours in the so-called CIE-L*a*b* colour space (simplified CIELab colour space) in Cartesian coordinates, as set out in DIN EN ISO 1 1664-4:2012-06 (EN ISO 11664-4:2011).

L* is the CIELab lightness, a*, b* are the CIELab coordinates, C* is the CIELab chroma and $h_{ab}$ is the CIELab hue angle.

The L*-axis describes the lightness (luminance) of the colour with values from 0 to 100. The L*-axis is perpendicular to the a*b*-plane at the zero point. It can also be called the neutral grey axis, because between the end points black (L*=0) and white (L*=100) all achromatic colours (grey tones) are contained.

On the a*-axis, green and red are opposite each other, the b*-axis runs between blue and yellow. Complementary colour tones are opposite each other by 180°, in their centre, i.e. the coordinate origin a*=0, b*=0, is grey.

The a*-axis describes the green component or red component of a colour, wherein negative values stand for green and positive values for red. The b*-axis describes the blue component or yellow component of a colour, wherein negative values stand for blue and positive values for yellow.

The a*-values range from about −170 to +100, the b*-values range from −100 to +150, wherein the maximum values only being reached at medium lightness of certain colour tones. The CIELab colour body has its greatest extent in the medium lightness range, but this extent varies in height and size depending on the colour range.

The CIELab hue angle $h_{ab}$ must be between 0° and 90° if both a* and b* are positive, between 90° and 180° if b* is positive and a* is negative, between 180° and 270° if both a* and b* are negative, and between 270° and 360° if b* is negative and a* is positive.

In the CIE-L*C*h colour space (simplified CIELCh colour space), the Cartesian coordinates of the CIELab colour space are transformed into polar coordinates. The cylindrical coordinates C* (chroma, relative colour saturation, distance from the L-axis in the centre) and h (hue angle, angle of the colour tone in the CIELab colour circle) are specified. The CIELab lightness L* remains unchanged.

The hue angle h results from the a* and b* axes $$h = \arctan\left(\frac{b^*}{a^*}\right).$$

The hue angle h here stands for the colour of the residual reflection of the reflection-reducing layer system 10.

The chroma C* results in $$C^* = \sqrt{(a^*)^2 + (b^*)^2}$$

The chroma C* is also called colour depth.

In known reflection-reducing coatings, the colour of the residual reflection is optimised for a perpendicular incidence of the light on the layer system 10 (AOI=0°) and varies greatly with changes in the viewing angle AOI.

As is shown in the following figures for various residual reflection colours blue, green, yellow, red, a layer system 10 according to the invention can be formed with four layer packets 42, 44, 46, 48 or five layer packets 42, 44, 46, 48, 50, which remains largely colour stable even when the viewing angle AOI is varied in the range between 0° and 30°. In other words, the colour impression of the residual reflection practically does not change when an observer views the optical element 100 at viewing angles AOI in this angular interval.

FIGS. 3 to 8 show values of a layer system 10 according to the invention with the residual reflection colour blue.

FIG. 3 shows a reflectivity R in percent of the layer system 10 according to the invention in the wavelength range between 280 nm and 1400 nm, and FIG. 4 shows a detail of the representation in FIG. 3 in the wavelength range 380 nm to 780 nm. The reflectivity R of the layer system 10 is determined in a top view of the layer system 10, i.e. at small angles AOI around 0°, measured from the surface normal 70 (FIGS. 1, 2).

FIG. 5 shows a progression of the chroma C*, depending on the viewing angle AOI between 0° and 45°, FIG. 6 shows a progression of the lightness L*, depending on the viewing angle AOI between 0° and 45°, FIG. 7 shows a progression of the hue angle h, depending on the viewing angle AOI between 0° and 45°. FIG. 8 shows a progression of the photopic reflectance Rv and of the scotopic reflectance Rv', depending on the viewing angle AOI between 0° and 45°.

The reflectivity R drops from about 55% at 280 nm with a small maximum around 380 nm and slowly rises again at about 730 nm (FIG. 3). As can be seen, the reflectivity R is very low between 480 nm and 780 nm and is smaller than 1% (FIG. 4). Between 530 nm and 730 nm, the reflectivity R is partially even below 0.5%.

In the AOI interval between 0° and 45°, the chroma C* drops from about 6.5 at 0° to about 2.5 at 30° down to 0 at about 42°, and then rises (FIG. 5). At 45°, the value of the chroma C* is about 1. The highest value of the chroma C* in the AOI interval for the colour blue is C*=7. The highest value of the chroma C* is at the lower boundary value of the AOI interval.

In the AOI interval between 0° and 25°, the lightness L* hardly varies with a slight drop and rises at 30° from about L*=4.5 to about L*=8 at 45° (FIG. 6).

In the AOI interval between 0° and 45°, the hue angle h drops slightly between 0° and 30° from about h=272° to slightly above h=268°, and then drops more steeply to h=260° at AOI=40° (FIG. 7).

For the residual reflection colour blue, the change Δh in the hue angle h between 0°≤AOI≤30° is preferably at most Δh=4°, particularly preferably at most Δh=3.5°. The change in the hue angle h between 0°≤AOI≤33° is preferably at most Δh=5°, particularly preferably at most Δh=4.5°.

In the AOI interval between 0° and 45°, the curves of photopic reflectance Rv and of the scotopic reflectance Rv' practically do not vary and remain at 0.5 (Rv) and 0.7-0.6 (Rv'), respectively, and rise to a value of 1 between AOI=30° and 45° (FIG. 8).

The FIGS. 9 to 14 show values of a layer system 10 according to the invention with the residual reflective colour green.

FIG. 9 shows a reflectivity R of the layer system 10 according to the invention in percent in the wavelength range between 280 nm and 1400 nm, and FIG. 10 shows a detail of the representation in FIG. 9 in the wavelength range 380 nm to 780 nm. The reflectivity R of the layer system 10 is determined in a top view of the layer system 10, i.e. at small angles AOI around 0°, measured from the surface normal 70 (FIGS. 1, 2).

FIG. 11 shows a progression of the chroma C*, depending on the viewing angle AOI between 0° and 45°, FIG. 12 shows a progression of the lightness L*, depending on the viewing angle AOI between 0° and 45°, FIG. 13 shows a progression of the hue angle h, depending on the viewing angle AOI between 0° and 45°. FIG. 14 shows a progression of the photopic reflectance Rv and of the scotopic reflectance Rv', depending on the viewing angle AOI between 0° and 45°.

The reflectivity R drops from about 55% at 280 nm with a small maximum around 380 nm and slowly rises again at about 730 nm (FIG. 9). As can be seen, the reflectivity R is very low between 430 nm and 730 nm and is smaller than 1% (FIG. 11). Around 530 nm and between about 600 nm and about 700 nm, the reflectivity R is partially even below 0.5%.

In the AOI interval between 0° and 45°, the chroma C* rises from about C*=5 at 0° to about C*=6 at 30°, continues to rise slightly, and then drops at 40° (FIG. 11). At 45°, the value of the chroma C* is approximately 5. The highest value of the chroma C* in the AOI interval for the colour green is C*=7. The highest value of the chroma C* is close to the upper boundary value of the AOI interval.

In the AOI interval between 0° and 30°, the lightness L* is almost constant with L*=5.5 and starts to rise at 25° and reaches L*=10 at 45° (FIG. 12).

In the AOI interval between 0° and 45°, the hue angle h is almost constant between 0° and 20° with about h=147° and starts to rise slightly from 20° to slightly above h=155° at AOI=40° (FIG. 13).

For the residual reflection colour green, the change Δh in the hue angle h between 0°≤AOI≤30° is preferably at most Δh=5°, particularly preferably Δh=2°. The change Δh in the hue angle h between 0°≤AOI≤45° is preferably at most Δh=5°, particularly preferably at most Δh=4.6°.

In the AOI interval between 0° and 45°, the curves of photopic reflectance Rv and of the scotopic reflectance Rv' are practically equal and are almost constant between 0° and 30° and both remain at 0.6 (Rv) and 0.7-0.6 (Rv'), respectively. The curves rise between AOI=30° to 45° to a value of 1.5 (FIG. 14).

The FIGS. 15 to 20 show values of a layer system 10 according to the invention with the residual reflection colour yellow.

FIG. 15 shows a reflectivity R in percent of the layer system 10 according to the invention in the wavelength range between 280 nm and 1400 nm, and FIG. 16 shows a detail of the representation in FIG. 9 in the wavelength range 380 nm to 780 nm. The reflectivity R of the layer system 10 is determined in a top view of the layer system 10, i.e. at small angles AOI around 0°, measured from the surface normal 70 (FIGS. 1, 2).

FIG. 17 shows a progression of the chroma C*, depending on the viewing angle AOI between 0° and 45°, FIG. 18 shows a progression of the lightness L*, depending on the viewing angle AOI between 0° and 45°, FIG. 19 shows a progression of the hue angle h, depending on the viewing angle AOI between 0° and 45°. FIG. 20 shows a progression of the photopic reflectance Rv and of the scotopic reflectance Rv', depending on the viewing angle AOI between 0° and 45°.

The reflectivity R drops from about 20% at 280 nm with a slightly higher maximum of just over 30% around 330 nm, then remains low and slowly rises again at about 680 nm (FIG. 15). As can be seen, the reflectivity R is very low between 430 nm and 580 nm and is smaller than 1% (FIG. 16).

In the AOI interval between 0° and 45°, the chroma C* slowly rises from about 6.5 at 0° to about 9 at 30°, has a maximum of 10 at about 35°, and then drops again (FIG. 17). At 45°, the value of the chroma C* is 8. The highest value of the chroma C* in the AOI interval for the colour yellow is C*=10 or just below. The highest value of the chroma C* is just below the upper boundary value of the AOI interval.

In the AOI interval between 0° and 25°, the lightness L* shows a small rise of about L*=6.5 at 0° and L*=10 at about 35°, and then slowly drops again (FIG. 18).

In the AOI interval between 0° and 45°, the hue angle h drops slightly from about h=84° to about h=83° between 0° and 30°, and then drops more steeply from 35° (FIG. 19).

For a residual reflection colour yellow, the change Δh in the hue angle h between 0°≤AOI≤30° is preferably at most Δh=1.5°, particularly preferably Δh=0.9°. The change Δh in the hue angle h between 0°≤AOI≤45° is preferably at most Δh=5, particularly preferably at most Δh=4.6°.

In the AOI interval between 0° and 45°, the curves of the photopic reflectance Rv and of the scotopic reflectance Rv' run parallel to each other and rise only slightly up to 20° and remain at 0.5 (Rv') and 0.7-0.6 (Rv), respectively, and rise to a value of 2 between AOI=30° and 45° (FIG. 20).

FIGS. 21 to 26 show values of a layer system 10 according to the invention with the residual reflection colour red.

FIG. 21 shows a reflectivity R in percent of the layer system 10 according to the invention in the wavelength range between 280 nm and 1400 nm, and FIG. 22 shows a detail of the representation in FIG. 9 in the wavelength range 380 nm to 780 nm. The reflectivity R of the layer system 10 is determined in a top view of the layer system 10, i.e. at small angles AOI around 0°, measured from the surface normal 70 (FIGS. 1, 2).

FIG. 23 shows a progression of the chroma C*, depending on the viewing angle AOI between 0° and 45°, FIG. 24 shows a progression of the lightness L*, depending on the viewing angle AOI between 0° and 45°, FIG. 25 shows a progression of the hue angle h, depending on the viewing angle AOI between 0° and 45°. FIG. 26 shows a progression of the photopic reflectance Rv and the scotopic reflectance Rv', depending on the viewing angle AOI between 0° and 45°.

The reflectivity R shows a maximum of about 20% around 330 nm and then drops to low values and slowly rises again at about 530 nm (FIG. 21). As can be seen, the reflectivity R is very low between 430 nm and 600 nm and is below 0.5% (FIG. 22).

In the AOI interval between 0° and 45°, the chroma C* rises from about C*=4 at 0° to about C*=10 at 30° and then remains constant between 35° and 45° (FIG. 23). At 45°, the value of the chroma C* is at most 14, e.g. between 13 and 14. The highest value of the chroma C* in the AOI interval for the colour red is C*=13. The highest value of the chroma C* is near to the upper boundary value of the AOI interval.

In the AOI interval between 0° and 25°, the lightness L* hardly varies with a small rise of about L*=3 and rises at 20° from about L*=4 to about L*=14 at 45° (FIG. 24).

In the AOI interval between 0° and 45°, the hue angle h rises slightly between 0° and 30° from about h=10° to slightly above h=16°, and then drops more steeply to h=20° at AOI=40° (FIG. 25).

For a residual reflection colour red, the change Δh in the hue angle h between 0°≤AOI≤30° is preferably at most Δh=6°, particularly preferably at most Δh=5.3°. The change Δh in the hue angle h between 0°≤AOI≤45° is preferably Δh=20°, particularly preferably at most Δh=16.8°.

In the AOI interval between 0° and 45°, the curves of the photopic reflectance Rv and of the scotopic reflectance Rv' practically do not vary between 0° and 20° and both start at 0.35 while the curve (Rv) rises more than the curve (Rv'). They rise to a value of 1 between AOI=30° and 45° (FIG. 26).

In the following Table 1, the layer thicknesses of a layer system with four layer packets 42, 44, 46, 48 are given as examples:

TABLE 1

Layer thicknesses of sub-layers 60, 62 for various residual reflection colours.

| | | | blue thickness [nm] | green thickness [nm] | yellow thickness [nm] | red thickness [nm] |
|---|---|---|---|---|---|---|
| | | air | | | | |
| | 34 | cover layer | | | | |
| 48 | 62 | $SiO_2$ | 81.7 | 70.7 | 62 | 71 |
| | 64 | functional layer | 12 | 16.6 | 12 | 12 |
| | 60 | $Ta_2O_5$ | 119.2 | 103 | 136 | 72 |
| 46 | 62 | $SiO_2$ | 17.6 | 19.1 | 9 | 13.48 |
| | 60 | $Ta_2O_5$ | 27.4 | 24.6 | 72 | 3.5 |
| 44 | 62 | $SiO_2$ | 49.7 | 75.9 | 6.7 | 4 |
| | 60 | $Ta_2O_5$ | 20.1 | 12 | 62 | 29.4 |
| 42 | 62 | $SiO_2$ | 54.9 | 64.3 | 28.8 | 41 |
| | 60 | $Ta_2O_5$ | 7.5 | 5 | 20 | 5 |
| | 32 | intermediate layer | | | | |
| | 20 | substrate | | | | |

It can be seen that if the layer materials of high refractive index sub-layer 60 nearer to the substrate and low refractive index sub-layer 62 further away from the substrate remain the same, the colour of the residual reflection can be achieved solely by changing the layer thicknesses of the sub-layers 60, 62. For example, $Ta_2O_5$ is used for all high refractive index sub-layers 60 and $SiO_2$ for the low refractive index sub-layers 62.

Only in the layer packet 48 furthest away from the substrate, a preferably low-refractive index functional layer 64 is arranged between the first and second sub-layers 60, 62. This serves, for example, for increasing the electrical conductivity and/or for mechanical stress equalisation and/or as diffusion barrier.

The difference between the results on layer systems 10 according to the invention with the residual reflection colours blue, green, yellow, red and the residual reflection colour of a known layer system from the prior art for a viewing angle interval of 0° to 30° can be seen in FIG. 27 in a representation in polar coordinates. FIG. 28 shows the same representation with a larger viewing angle interval of 0° to 45°.

As can be seen from both of the figures, different reflective colours with high colour consistency can be achieved. Due to the relatively low value of the chroma C* of at most 16, particularly preferably of at most 14, at the upper boundary value of the viewing angle AOI, a colour definition of the residual reflection is achieved.

In these two polar diagrams, the colour angle h is the angle of the diagram from 0° to 360° and the chroma C* is given as a radius with values from 0 to 14.

Here, BL denotes the progression of the residual reflection colour blue, GR denotes the progression of the residual reflection colour green, GE denotes the progression of the residual reflection colour yellow, RO denotes the progression of the residual reflection colour red, and PR denotes the progression of the residual reflection colour of a layer system according to prior art.

The small arrows next to the measurement points indicate the direction of the change in the viewing angle AOI from 0° to 30° and 0° to 45°, respectively, in FIG. 28. The measurement values of the different residual reflection colours of the layer system 10 according to the invention run practically on straight lines passing through the centre of the representation. In this representation, the straight lines indicate the various residual reflection colours.

For a typical residual reflection colour green at 0° of a commercially available prior art spectacle lens with reflection-reducing coating, the change Δh in the hue angle h between 0°≤AOI≤30°, on the other hand, is typically Δh=127.2°. The colour of the residual reflection changes from green via blue to red.

The change in the hue angle h between 0°≤AOI≤45° is typically 161.7°.

For the residual reflection colour blue, the change Δh in the hue angle h between 0°≤AOI≤30° is preferably at most Δh=4°, particularly preferably at most Δh=3.5°. The change Δh in the hue angle h between 0°≤AOI≤33° is preferably at most Δh=5°, particularly preferably at most Δh=4.5°.

For a residual reflection colour green, the change Δh in the hue angle h between 0°≤AOI≤30° is preferably at most Δh=3°, particularly preferably at most Δh=2°. The change Δh in the hue angle h between 0°<AOI<45° is preferably at most Δh=5°, particularly preferably at most Δh=4.6°.

For a residual reflection colour yellow, the change Δh in the hue angle h between 0°≤AOI≤30° is preferably at most Δh=1.5°, particularly preferably at most Δh=0.9°. The change Δh in the hue angle h between 0°≤AOI≤45° is preferably at most Δh=5°, particularly preferably at most Δh=4.6°.

For a residual reflection colour red, the change Δh in the hue angle h between 0°≤AOI≤30° is preferably at most Δh=6°, particularly preferably at most Δh=5.3°. The change Δh in the hue angle h between 0°≤AOI≤45° is preferably at most Δh=20°, particularly preferably at most Δh=16.8°.

FIG. 29 shows a flow chart of a convenient method for designing an optical element 100 according to the invention.

In the method for designing an optical element 100 according to the invention, a layer design is defined in step S100. The layer design comprises at least a first material for high refractive index sub-layers 60 and a second material for low refractive index sub-layers 62, the number of desired layer packets 42, 44, 46, 48, or 42, 44, 46, 48, 50 with the sub-layers 60, 62, the starting values of the thickness of the sub-layers 60, 62, and the like.

In step S102, target colour values are defined. The target colour values comprise lightness L*, chroma C* and hue angle h at least at boundary values for an interval of a viewing angle AOI with boundary values of 0° and 30°. Optionally, a reflectance curve can be specified as an optimisation specification, but it is preferred to specify the target colour values at the boundary values of the viewing angle 0° and 30°.

In step S104, an optimisation method for varying the single layer thicknesses is performed until an optimisation target is reached. The optimisation method then varies the single layer thicknesses until the optimisation target (colour stability) is reached.

Advantageously, the target colour values are selected to be equal to or as similar as possible to the boundary values of the interval, wherein preferably only the aforementioned changes Δh in the hue angle h are permitted.

Typically, an adapted simplex algorithm can be used as a calculation method, but other known simulation methods can be equally suitable. Simulation software for such optimisation methods is commercially available from various manufacturers, for example the commercial simulation software "Essential MacLeod" or other well-known simulation software for the production of optical layers.

The invention claimed is:

1. An optical element, comprising a substrate and an interferometric reflection-reducing layer system on at least one surface of the substrate, wherein the layer system comprises a stack of at least four successive layer packets, wherein each layer packet comprises a first sub-layer with a first optical thickness and a second sub-layer with a second optical thickness which differs from the first optical thickness, the stack of at least four successive layer packets including a first layer packets that is the closest to the substrate, a second layer packets that is immediately next to the first layer packets, a third layer packets that is immediately next to the second layer packets, and a fourth layer packets that is immediately next to the third layer packets and is an uppermost layer packets, wherein a refractive index of the respective first sub-layer nearer to the substrate is greater than a refractive index of the respective second sub-layer further away from the substrate of the stack, wherein the layer system has a lightness, a chroma, and a hue angle of a residual reflection colour, wherein the absolute value of a change in the hue angle of the residual reflection colour in an interval of a viewing angle with the boundary values of 0° and 30°, relative to a surface normal onto the layer system, is smaller than the absolute value of a change in the chroma in the interval of the viewing angle, wherein the chroma at the upper boundary value of the viewing angle has a value of at most 16 and wherein the maximum value of the chroma in the interval of the viewing angle is at most 16, wherein the hue angle in the interval of the viewing angle with the boundary values 0° and 30° changes by at most 15°, and wherein:

for a blue residual reflection color, the first layer package has a first sub-layer with a thickness of 7.5 nm and a second sub-layer with a thickness of 54.9 nm, the second package has a first sub-layer with a thickness of 20.1 nm and a second sub-layer with a thickness of 49.7 nm, the third layer package has a first sub-layer with a thickness of 27.4 nm and a second sub-layer with a thickness of 17.6 nm, and the fourth layer package has a first sub-layer with a thickness of 119.2 nm and a second sub-layer with a thickness of 81.7 nm;

or for a green residual reflection color, the first layer package has a first sub-layer with a thickness of 5 nm and a second sub-layer with a thickness of 64.3 nm, the second layer package has a first sub-layer with a thickness of 12 nm and a second sub-layer with a thickness of 75.9 nm, the third layer package has a first sub-layer with a thickness of 24.6 nm and a second sub-layer with a thickness of 19.1 nm, and the fourth layer package has a first sub-layer with a thickness of 103 nm and a second sub-layer with a thickness of 70.7 nm.

2. The optical element according to claim 1, wherein the absolute value of the change in the hue angle in a second interval of a viewing angle from 0° up to a boundary viewing angle with upper boundary values of 30° to 45°, relative to the surface normal onto the layer system, is smaller than the absolute value of a change in the chroma in the second interval of the viewing angle, and the absolute value of the chroma at the boundary viewing angle is at least 2.

3. The optical element according to claim 2, wherein the hue angle in the second interval changes by at most 20°.

4. The optical element according to claim 2, wherein the hue angle in the second interval changes by at most 15°.

5. The optical element according to claim 1, wherein the photopic reflectance in the interval of the viewing angle with the boundary values 0° and 30° is at most 1.5%.

6. The optical element according to claim 1, wherein the scotopic reflectance in the interval of the viewing angle with the boundary values 0° and 30° is at most 1.5%.

7. The optical element according to claim 1, wherein the first sub-layers are formed from a high refractive index material formed from one or more of the compounds $Ta_2O_5$, $TiO_2$, $ZrO_2$, $Al_2O_3$, $Nd_2O_5$, $Pr_2O_3$, $PrTiO_3$, $La_2O_3$, $Nb_2O_5$, $Y_2O_3$, $HfO_2$, InSn oxide, $Si_3N_4$, MgO, $CeO_2$, ZnS and/or their modifications, and their other oxidation states.

8. The optical element according to claim 1, wherein the second sub-layers are formed from a low refractive index material formed from one of the compounds $MgF_2$, SiO, $SiO_2$, $SiO_2$ without or with additions of Al, silanes, siloxanes in pure form and/or with their fluorinated derivatives.

9. The optical element according to claim 1, wherein at least the first sub-layers are formed from a same first material and the second sub-layers are formed at least predominantly from a same second material.

10. A method for designing an optical element according to claim 1, wherein the optical element comprises a substrate and an interferometric reflection-reducing layer system on at least one surface of the substrate,
wherein the layer system comprises a stack of at least four successive layer packets, wherein each layer packet comprises a first sub-layer with a first optical thickness and a second sub-layer with a second optical thickness which differs from the first optical thickness,
wherein a refractive index of the respective first sub-layer nearer to the substrate is greater than a refractive index of the respective second sub-layer further away from the substrate of the stack,
wherein the layer system has a lightness, a chroma, and a hue angle of a residual reflection colour,
wherein the absolute value of a change in the hue angle of the residual reflection colour in an interval of a viewing angle with the boundary values 0° and 30°, relative to a surface normal onto the layer system, is smaller than the absolute value of a change in the chroma in the interval of the viewing angle, wherein the following steps are carried out:
defining a layer design, comprising at least a first material for high refractive index sub- layers and a second material for low refractive index sub-layers, number of desired layer packets with the sub-layers, starting values of the thickness of the sub-layers;
defining target colour values comprising lightness, chroma, and hue angle at least at boundary values for an interval of a viewing angle with boundary values of 0° and 30°;
performing an optimisation method for varying the single layer thicknesses until an optimisation target is reached.

11. The method according to claim 10, wherein a value of at most 16 is selected for the chroma at the upper boundary value of the viewing angle and/or wherein a maximum value in the interval of the viewing angle of at most 16 is selected for the chroma.

12. The method according to claim 10, wherein the target colour values at the boundary values of the interval are chosen to be equal.

13. The optical element according to claim 1, wherein the hue angle in the interval of the viewing angle with the boundary values 0° and 30° changes by at most 10°.

14. The optical element according to claim 1, wherein the photopic reflectance in the interval of the viewing angle with the boundary values 0° and 30° is at most 1.2%.

15. The optical element according to claim 1, wherein the scotopic reflectance in the interval of the viewing angle with the boundary values 0° and 30° is at most 1.2%.

16. The optical element according to claim 1, wherein in an outermost layer package out of the stack of at least four successive layer packets that is away from the substrate, a physical layer thickness of the first sub-layer, which is closer to the substrate, is greater than a physical layer thickness of the second sub-layer, which is further away from the substrate.

17. The optical element according to claim 1, wherein the first sub-layer for each of the four successive layer packets is formed of $Ta_2O_5$ and the second sub-layer for each of the four successive layer packets is formed of $SiO_2$.

* * * * *